United States Patent [19]

Exley et al.

[11] Patent Number: 5,724,577
[45] Date of Patent: Mar. 3, 1998

[54] METHOD FOR OPERATING A COMPUTER WHICH SEARCHES A RELATIONAL DATABASE ORGANIZER USING A HIERARCHICAL DATABASE OUTLINE

[75] Inventors: Francis E. Exley, Arlington, Va.; Glenn C. McCoy, Nichols, N.Y.; Susan C. Nicholson, Owego, N.Y.; Eric Masselle, Vestal, N.Y.

[73] Assignee: Lockheed Martin Corporation, Bethesda, Md.

[21] Appl. No.: 472,763

[22] Filed: Jun. 7, 1995

[51] Int. Cl.⁶ .................................................. G06F 17/30
[52] U.S. Cl. .................. 395/611; 395/601; 395/500; 395/348
[58] Field of Search ...................... 395/600, 575, 395/153, 611, 500, 601, 348; 370/92; 364/900, 419.19

[56] References Cited

U.S. PATENT DOCUMENTS

| | | | |
|---|---|---|---|
| 4,429,385 | 1/1984 | Cichelli et al. | 370/92 |
| 4,791,556 | 12/1988 | Vilkaitis | 395/348 |
| 4,939,689 | 7/1990 | Davis et al. | 364/900 |
| 5,036,484 | 7/1991 | McCoy et al. | 395/500 |
| 5,165,031 | 11/1992 | Pruul et al. | 395/575 |
| 5,257,185 | 10/1993 | Farley et al. | 364/419.19 |
| 5,369,763 | 11/1994 | Biles | 395/600 |
| 5,388,196 | 2/1995 | Pajak et al. | 395/153 |
| 5,467,471 | 11/1995 | Bader | 395/600 |
| 5,483,651 | 1/1996 | Adams et al. | 395/601 |
| 5,504,879 | 4/1996 | Eisenberg et al. | 395/600 |
| 5,544,360 | 8/1996 | Lewak et al. | 395/600 |

OTHER PUBLICATIONS

Angus, Jeff "OrgPlus Sports a Sophisticated Set of Design Elements", INFOWORLD, v15, n35, Aug. 30, 1993.

Primary Examiner—Thomas G. Black
Assistant Examiner—Charles L. Rones
Attorney, Agent, or Firm—Lane Aitken and McCann

[57] ABSTRACT

A computer data organization method in which data is organized in a hierarchical outline with each data element in the outline having a key field in which an identifier is inserted which is unique to that data element. Data related to each data element in the hierarchical outline are stored in a relational data base table with the unique key identifier of the hierarchical data element to which it is related inserted in a key index column. To make a fresh entry, a user types an appropriate outline heading in the field presented by the hierarchical data base manager and an identifier key unique to this entry is inserted, preferably automatically.

3 Claims, 4 Drawing Sheets

METHOD FOR OPERATING A COMPUTER WHICH SEARCHES A RELATIONAL DATABASE ORGANIZER USING A HIERARCHICAL DATABASE OUTLINE

BACKGROUND OF THE INVENTION

1. Field of the Invention

This invention relates to an improved computer method for managing data, and more particularly to a data management method that allows a user to manipulate data hierarchically and relationally while retaining both the hierarchical and the relational information for each data element in the data structure.

2. Description of the Prior Art

As will be appreciated by those skilled in the art, data items have a hierarchical arrangement when a data element can be regarded as below or belonging to another data item that is at a higher level. Hierarchical data structures are common both in ordinary life and in the organization of computer data structures. For example, widely available computer outline programs make it possible to organize information in a hierarchical outline format. When working with information in an outline format, a user sometimes wants to see only the broadest points in the outline, e.g. the top two or three levels of the outline. At other times, a user wants to see if the information related to a specific outline entry. An outline is structured as a tree with each data item displayed below the item above it, with certain lower levels of the outline indented more that upper levels. In computer data bases organized as a hierarchial outline, recursion can be used by the program to display the outline. The part of the outline below each data item can be displayed as if it were a complete outline of its own.

As will also be appreciated by those skilled in the art, in a relational data base, data is organized in a format of rows and columns. The table defines a relation between the data items in each row, for example:

| Name | City | State |
| --- | --- | --- |
| Downing, D. | Seattle | Washington |
| Covington, M. | Athens | Georgia |

In this example, the table defines for Downing, Seattle is the city and Washington is the state. One important operation carried out with data organized into a relational data base is to join two data base tables, i.e. cross-reference information between two or more tables with a common row. The table given in the example above could be cross-referenced to another relational data base table with names and salaries to give a resulting table relating name, city, state, and salary.

While computer programs to provide hierarchical data management and computer programs to provide relational data management are each well known and widely used in the prior art, prior art programs require a substantial user input, typically a user input via a keyboard, in order to manage dynamically changing hierarchical data with relational attributes. This manual method is cumbersome, labor-intensive and many times unreliable.

SUMMARY OF THE INVENTION

An object of this invention is the provision of a relational data organizer that combines the power of an outline data base manager tool with relational data base functions.

Another object of this invention is the provision of a relational data organizer which provides a data outline in which each outline item can also have associated fields or attributes, which provide additional information about the outline element.

A further object of the invention is the provision of a relational data organizer which allows a user to change the presentation of data without changing the data.

Briefly, this invention contemplates the provision of a computer data organization method in which data is organized in a hierarchical outline with each data element in the outline having a key field in which an identifier is inserted which is unique to that data element. Data related to each data element in the hierarchical outline are stored in a relational data base table with the unique key identifier of the hierarchical data element, to which it is related, inserted in a key index column. To make a fresh entry, a user types an appropriate outline heading in the field presented by the hierarchical data base manager and an identifier key unique to this entry is inserted, preferably automatically, in a field for this heading. Alternatively, the user can enter the unique key. In making a fresh entry in the relational data base, the user types information into appropriate fields and the system inserts a unique key information attribute. These keys link the entry in the relational data base related to the entered outline heading and link related entries in different rows of the relational data base. Transparent to the user, the relational data base can be searched for data related to a hierarchical entry by means of the entry itself since the key field in the hierarchical entry points to a row in the relational table. This pointer does not change even though hierarchical data changes, for example, changes its position in the hierarchy.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
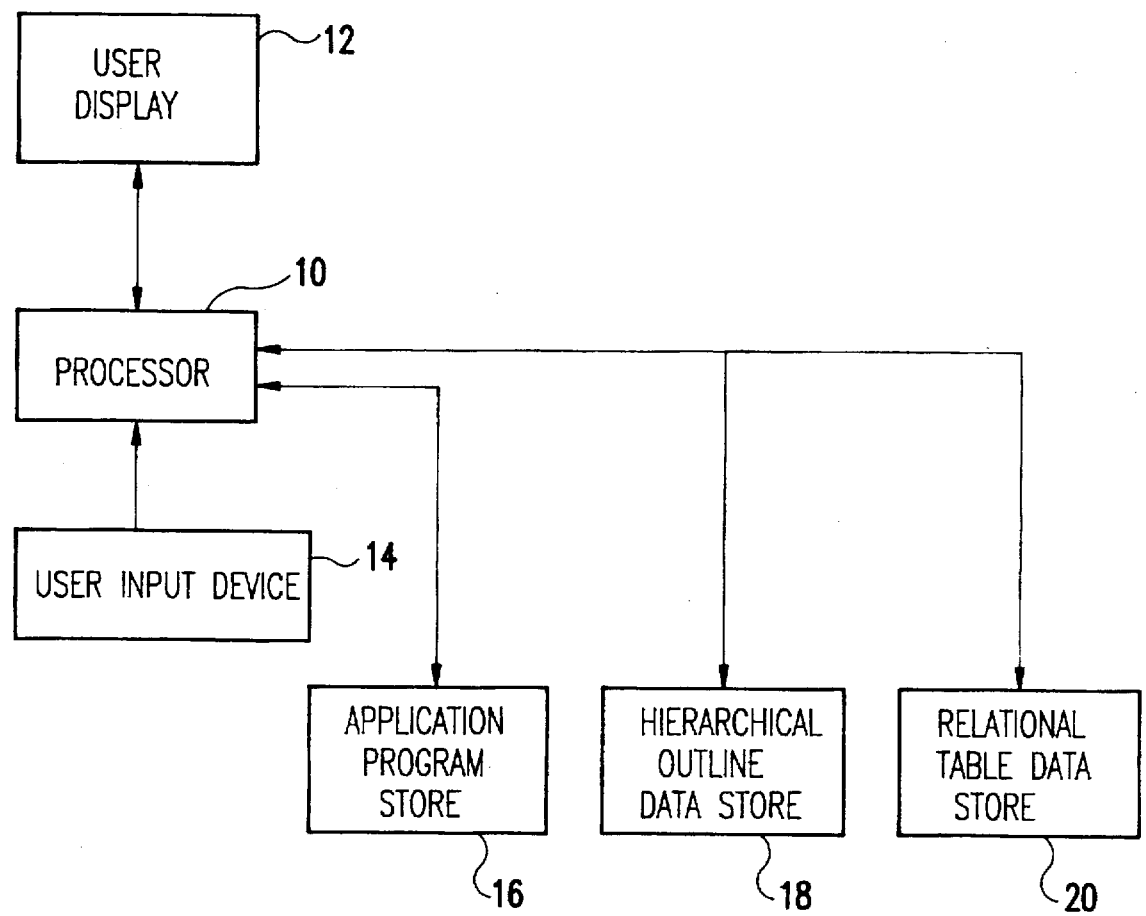
FIG. 1 is a block diagram of computer system components for implementation of a relational data organization method in accordance with the teachings of this invention.

Referring now to FIG. 1, the computer system components to implement a relational data organizer in accordance with the invention include a processor 10, a CRT display 12 and a user input device 14, which may comprise a keyboard or a mouse, for example. The system also functionally includes a program store 16, a hierarchical outline data store 18 and a relational table data store 20 with the data stores 18 and 20 linked by pointer fields. The program store includes a suitable commercially available application program for managing the hierarchial data base 18 and a suitable commercially available application program for managing the relational data base 20.

Figure 2:
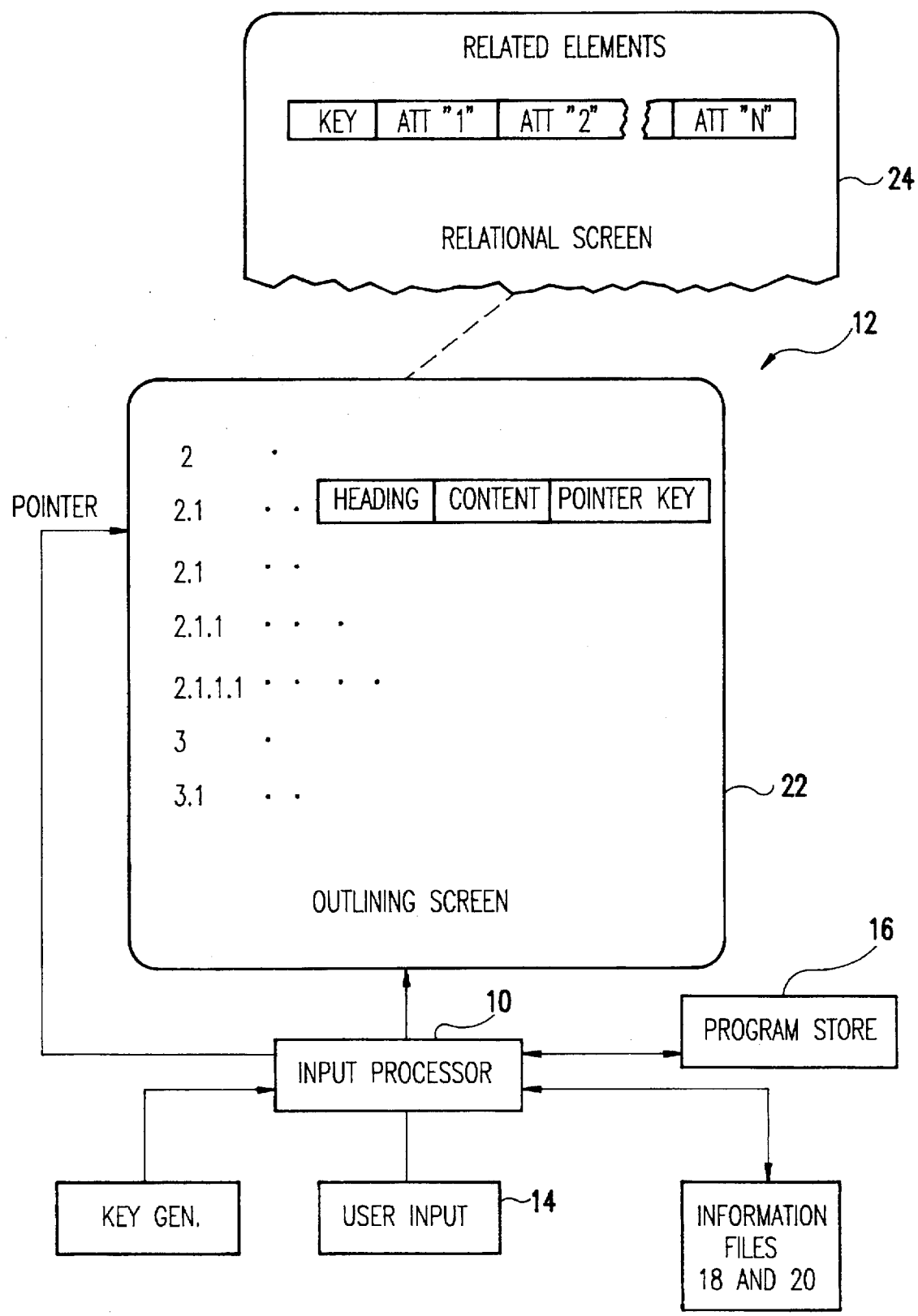
FIG. 2 is a block diagram similar to FIG. 1 pictorially illustrating user screens, which are representative of screens used to provide a user interface data management method in accordance with the teachings of this invention.

Referring now to FIG. 2, it shows illustrative CRT screen displays for user input of data to the relational data organizer of this invention. While FIG. 2 suggests an OUTLINING SCREEN 22 for user inputs to the outline hierarchical data base and a separate RELATIONAL SCREEN 24 for user inputs to the relational data table, those skilled in the art will appreciate that in a window operating environment, both screens could be displayed simultaneously. The hierarchical screen 22 prompts a user to input data as headings in an outline format familiar to those skilled in the art, in which children of a parent heading are established in the data base by indenting the children and, if desired, assigning hierarchical designators to the outline data entries. The outlining screen 22 prompts the user to input a heading for each outline element. A key unique to that heading is preferably automatically generated by a key generator 21, such as a time of day clock, which uniquely time and date stamps each new entry at the time it is entered. It will be appreciated that the clock 21 is typically incorporated in processor 10. It will be also appreciated that a unique key may be manually entered by an operator, if desired. This key field serves to link the hierarchical and relational data bases.

After the user has inputted the outline data, the system then prompts the user (screen 24) to input data related to that outline heading. This relational data table, in addition to typical attribute columns, includes an attribute column that stores the key of the hierarchical entry to which it relates. The system inputs the key from the just previous outline heading automatically. A user can use a single key stroke to store data in the respective data base or use a mouse drive cursor to input the data.

Figure 3:
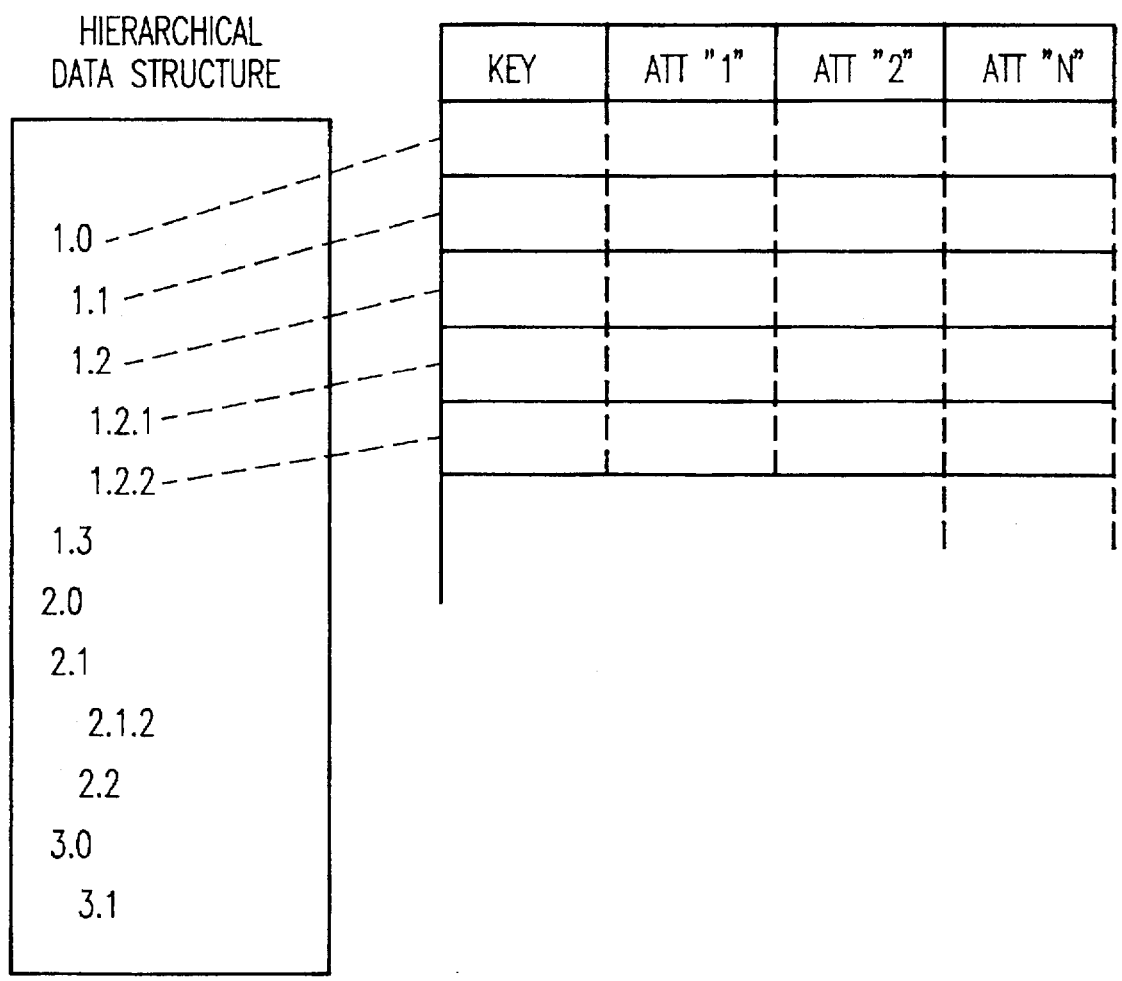
FIG. 3 is a pictorial representation of the pointer fields that link the hierarchical data base and the relational data base in accordance with the teachings of this invention.

Referring now to FIG. 3, as illustrated therein, each element in the hierarchical data base has at least one row in the relational data base table with the key field establishing a linkage between the two data bases, which is not changed or altered when the data in the hierarchial data base is changed or altered by the user performing such standard operations on the hierarchial data such as so called cutting and pasting operations. This allows a user to easily manage a set of data elements which have a dynamic hierarchy and allows additional information to be associated with each data element. Of course, each heading of the outline data may point to more than one row in the relational data table and the relational data table may have as many attribute columns as desired. Thus a user, with simple direct inputs, is able to edit, move, copy, and change to view of all the hierarchical and relational information. For example, a user may have an outline with an owner attribute. The user can collapse the view of the data outline based on the owner attribute.

Figure 4:
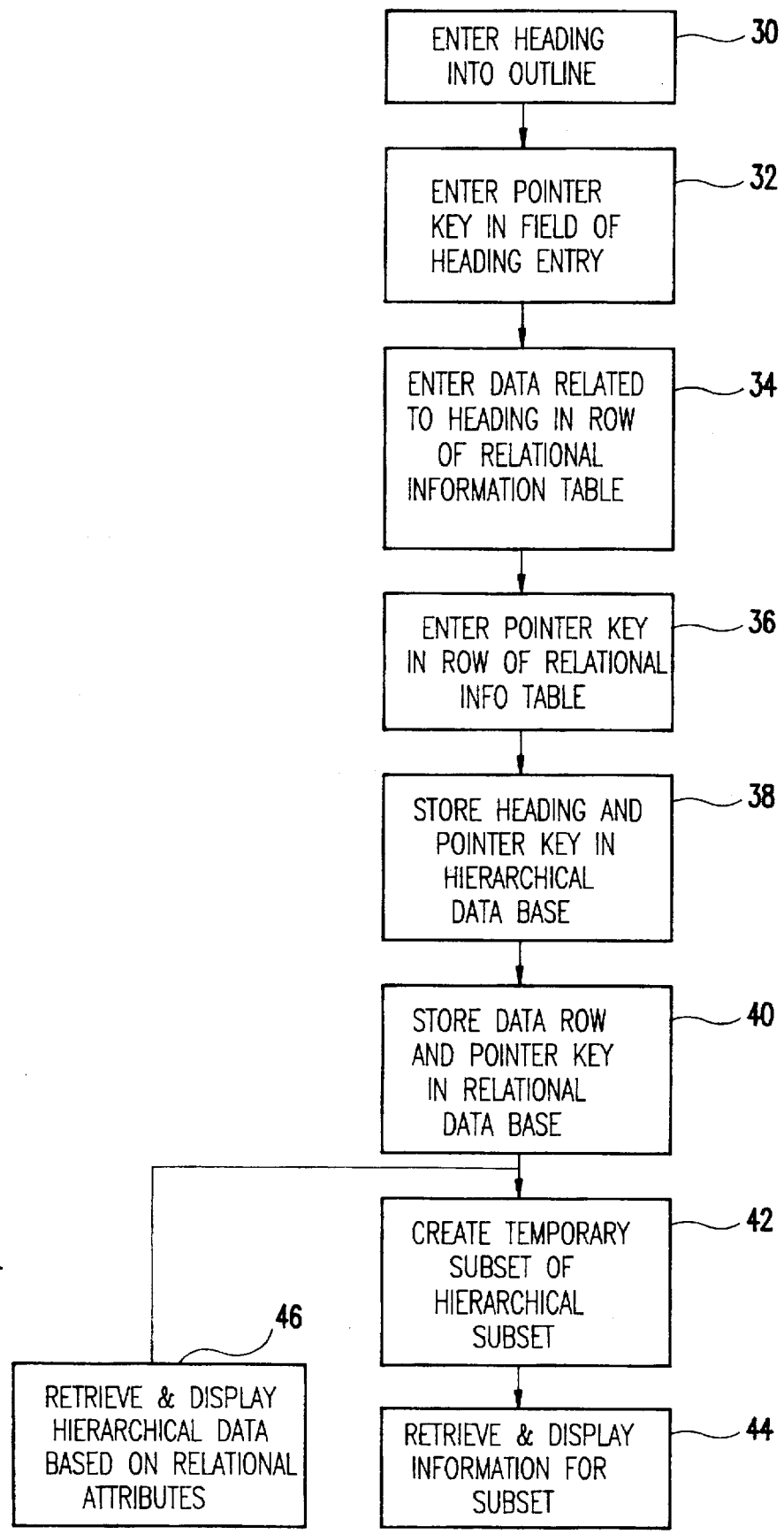
FIG. 4 is a flow diagram of steps in forming a relationally organized data base in accordance with the teachings of this invention.

Referring now to FIG. 4, in operation in forming and using the linked data bases in accordance with the invention, an outline screen 22 presents a user with a table of contents view with headings previously entered by the user or with a screen ready for composition. In block 30, the user types an appropriate heading and then can press one key to display, add, or edit any other attributes already associated with this entry. The key field, which is the linkage to the relational table data base, can be entered automatically, or from a pick-list, or typed in by the user, block 32. A user places the cursor on a desired indented list entry, pressing a key to manually manipulate (i.e. move, edit, insert at a level or a different level, demote/promote) an entry. The linking key unique to this manipulated entry is not altered by the operation so that with a single additional keystroke the user can search the index column of the relational data base and call up and view the relational information associated with this hierarchal outline entry. To view the relational data for a heading element the user merely places the cursor on the heading and with one key stroke the system will search the relational data table with the key as an index, and display the relational data for that heading.

In entering data to and displaying data from the relational data base table, a user may display all relational data base entries with a selected parameter attribute, or range of parameter attributes or logical ANDing or logical ORing of parameter attributes. The resulting display may be a line presentation of a few fields that describe the relational record. Placing the cursor on the line enables the user to display all fields of the record. To insert or add new data in the relational table the user types information into the appropriate fields, where one field is a linkage to the other relational tables and/or the hierarchical list, blocks 34 and 36. Changing data in the list does not alter the key index field. When the entries have been made respectively on hierarchical and relational screens, the user can, using a single input operation, store the information in the respective data bases, blocks 38 and 40.

In recalling stored data for use, the user can initially retrieve the hierarchical outline headings and, using simple input commands, create a temporary subset of said hierarchical information structure using parent and child relationships in the hierarchical information structure, block, block 42. With respect to the temporary subset, the user can then retrieve and display relational information associated with the unique keys of the data elements in the temporary subset of the hierarchical information structure, block 44. Similarly the user can then search for specified attributes in relational information table responsive to user input and create a corresponding subset of the hierarchical information structures, again using the unique keys associates with the values found in the relational information table, block 46.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer method to facilitate user organization and manipulation of data, including the steps of:

presenting a user with a first display screen that prompts the user to enter each of a plurality of data elements respectively as a heading in a hierarchical outline displayed on the display screen;

generating a unique identifier, which is unique to each said heading in said hierarchical outline inputted by a user in response to said prompt presented by said first display screen;

presenting the user with a second display screen that prompts the user to enter data in a relational data base respectively related to each said heading in a hierarchical outline;

generating, as an indexable attribute for said relational data base, said unique identifier unique to each said heading in the hierarchical outline to which said data in a relational data base inputted by a user in response to said prompt presented by said second display screen is related;

storing data inputted by a user prompted by said first display screen in the hierarchial data base with said unique identifier;

storing data inputted by a user prompted by said second display screen in the relational data base including said unique identifier, whereby said unique identifier serves as a pointer to link said hierarchical data base and said relational data base;

searching for specified attributes in said relational data base responsive to a user input and creating a corresponding subset of the hierarchical data base using the unique identifier corresponding to the unique identifier for the specified attributes in the relational data base.

2. A computer method to facilitate user organization and manipulation of data as in claim 1 wherein said unique identifier is generated automatically in response to a user input.

3. A computer method to facilitate user organization and manipulation of data as in claim 2 wherein said unique identifier is a computer generated time and date code.

* * * * *